Patented Feb. 18, 1947

2,415,950

UNITED STATES PATENT OFFICE 2,415,950

CHROMIUM COMPOUND

Frank W. Hurd, New York, N. Y., assignor to Pittsburgh Plate Glass Company, Pittsburgh, Pa., a corporation of Pennsylvania No Drawing. Application February 8, 1943,
Serial No. 475,169

1 Claim. (Cl. 23—87)

This invention relates to a new and useful chemical compound of chromium and ammonia. The new compound is a pale blue water soluble crystalline solid which is unstable when moist. The material is, however, sufficiently stable to permit the separating, washing, and drying. After the drying operation the compound is quite stable and may be stored for considerable periods of time.

The new compound was identified as chromous ammonium chloride having the molecular constitution as follows:

$$Cr(NH_4)_4Cl_6$$

The new material may be prepared by the electrolytic reduction of a water solution of chromic chloride in the presence of ammonium ion. The ammonium ion and chromic chloride must be present in sufficient quantity that the solubility product of the new compound will be exceeded while there remains in solution an excess of ammonium chloride over the chromous chloride formed by the electrolysis. The salt may also be prepared by mixing concentrated water solutions of chromous chloride and ammonium chloride in proper proportions. The salt formation is favored at low temperatures (0°–15° C.) but can be prepared at higher temperatures (25°–30° C.) in smaller yields.

This invention is useful as a means of recovering chromium salts from waste electrolytic baths which have become unfit for further electrolysis. The waste solutions are mixed with an excess of ammonium chloride and electrolysis continued to precipitate the chromium as chromous ammonium chloride which is then readily separated by filtration. The invention may also be used as a means of preparing pure chromium compounds from impure of technical grade chromium chloride. By the electrolysis of the water solutions in the presence of ammonium chloride and the chromium may be effectively separated from iron magnesium and aluminum.

The new chemical compound may also be used as a reducing agent in organic reductions or in analytical procedures. It may also be used as an oxygen absorbent to replace pyrogallol in volumetric gas analysis procedures or in gas purification trains. The chromous ammonium chloride may also be used as a source of divalent chromium for fused salt electrolysis since the ammonia, water and hydrogen chloride are readily driven off by heating.

Example I

A solution, 2 molar with respect to chromic chloride and 2 molar in ammonium chloride was electrolyzed at 14° C. After 7% of the trivalent chromium had been reduced to the divalent form a solid crystalline salt having a pale blue color was precipitated. The salt was separated by filtration and washed with concentrated ammonium chloride solution.

Example II

The procedure of Example I was repeated at 25° C. The crystalline chromous ammonium chloride was formed but in somewhat smaller yield than in Example I.

I claim:

The solid compound having the formula $$Cr(NH_4)_4Cl_6$$

FRANK W. HURD.

REFERENCES CITED

The following references are of record in the file of this patent:

UNITED STATES PATENTS

| Number | Name | Date |
|---|---|---|
| 1,157,668 | Boner | Oct. 26, 1915 |
| 1,781,789 | McCullough et al. | Nov. 18, 1930 |
| 1,838,777 | McCullough et al. | Dec. 29, 1931 |
| 2,088,615 | Schlotter | Aug. 3, 1937 |

OTHER REFERENCES

Treatise on Inorganic and Theoretical Chemistry, 1931, Mellor, vol. 11, pages 366–368. (Copy in Division 59 of the Patent Office.)

Journal Physical Chemistry, 1905, pages 240–244. (Copy in the Patent Office Library.)